(12) United States Patent
Urasaki et al.

(10) Patent No.: US 11,893,216 B1
(45) Date of Patent: *Feb. 6, 2024

(54) MULTI-FUNCTION GRAPHICAL USER INTERFACE BUTTON

(71) Applicant: Google LLC, Mountain View, CA (US)

(72) Inventors: Cinthya Rossana Urasaki, New York, NY (US); Zachary Paul Maier, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,708

(22) Filed: Dec. 14, 2020

Related U.S. Application Data

(63) Continuation of application No. 15/790,378, filed on Oct. 23, 2017, now Pat. No. 10,866,712, which is a continuation of application No. 13/648,173, filed on Oct. 9, 2012, now Pat. No. 9,798,450.

(60) Provisional application No. 61/566,517, filed on Dec. 2, 2011.

(51) Int. Cl.
*G06F 3/04842* (2022.01)
*G06F 3/0481* (2022.01)

(52) U.S. Cl.
CPC ........ *G06F 3/04842* (2013.01); *G06F 3/0481* (2013.01)

(58) Field of Classification Search
CPC ............................. G06F 3/04842; G06F 3/0481
See application file for complete search history.

(56) References Cited

U.S. PATENT DOCUMENTS

| 5,276,795 A | * | 1/1994 | Hoeber ................. G06F 3/0482 715/813 |
| 5,598,183 A | * | 1/1997 | Robertson ........... G06F 3/04812 345/157 |
| 5,828,376 A | * | 10/1998 | Solimene .............. G06F 3/0482 715/821 |
| 7,783,622 B1 | | 8/2010 | Vandermolen et al. |
| 7,831,982 B2 | | 11/2010 | Smirnov et al. |
| 8,626,823 B2 | | 1/2014 | Kumar |
| 2004/0239703 A1 | | 12/2004 | Angelica |
| 2006/0069666 A1 | * | 3/2006 | Burke .................... G06Q 99/00 |

(Continued)

OTHER PUBLICATIONS

AddThis Labs Floating Vertical Bar Demo. Archived Oct. 30, 2011. 7 pages. https://web.archive.org/web/20111030072617/http://www.addthis.com:80/labs/floating-vertical-bar (Year: 2011).*

(Continued)

*Primary Examiner* — John T Repsher, III
(74) *Attorney, Agent, or Firm* — Lowenstein Sandler LLP

(57) ABSTRACT

Methods, systems, and computer programs are presented for implementing a multi-function control element in a Graphical User Interface (GUI). The method includes responsive to a cursor being away from a control element, present the control element in a compact state in the Graphical User Interface (GUI) within a display. The method also includes responsive to the cursor being over the control element, present the control element in an expanded state. The method includes responsive to receiving the selection of the option and determining the cursor is away from the control element, return the control element to the compact state from the expanded state.

17 Claims, 9 Drawing Sheets

(56) References Cited

U.S. PATENT DOCUMENTS

| | | | |
|---|---|---|---|
| 2006/0149777 A1* | 7/2006 | Marchev | G06F 9/451 |
| 2006/0212442 A1 | 9/2006 | Conrad et al. | |
| 2007/0136690 A1* | 6/2007 | MacLaurin | G06F 3/0482 |
| | | | 715/822 |
| 2007/0157100 A1 | 7/2007 | Wiggen | |
| 2008/0010319 A1* | 1/2008 | Vonarburg | G06F 16/95 |
| 2008/0147354 A1 | 6/2008 | Rowan et al. | |
| 2009/0282346 A1 | 11/2009 | Bechtel et al. | |
| 2010/0157170 A1* | 6/2010 | Carlsgaard | H04N 21/4312 |
| | | | 348/734 |
| 2011/0022966 A1* | 1/2011 | Rose | G06F 3/0484 |
| | | | 715/747 |
| 2011/0078232 A1 | 3/2011 | Van Den Driessche | |
| 2011/0265035 A1* | 10/2011 | Lepage | G06F 3/0482 |
| | | | 715/810 |
| 2012/0047146 A1* | 2/2012 | Balakrishnan | G06F 16/34 |
| | | | 707/748 |
| 2012/0150661 A1 | 6/2012 | DeStein et al. | |
| 2012/0233020 A1 | 9/2012 | Eberstadt et al. | |
| 2012/0233239 A1* | 9/2012 | Urim | G06F 9/542 |
| | | | 709/203 |
| 2013/0067334 A1 | 3/2013 | Rose | |

OTHER PUBLICATIONS

Screen captures from YouTube video clip entitled "How to add retweet button to Wordpress site," 11 pages, uploaded on Jun. 17, 2010 by user "andytraub". Retrieved from Internet: <https://www.youtube.com/watch?v=y3p5SjUYEOI> (Year: 2010).*

"Fancy Social Bookmarks ." Archived Jan. 19, 2011. 7 pages. https://web.archive.org/web/20110119061134/http://demos.dnnzone.com/Miscellaneous/InteractiveFancySocialBookmarks.aspx (Year: 2011).*

Screen captures from YouTube video clip entitled "Digg iPhone App Demo," 35 pages, uploaded on Mar. 23, 2010 by user "digg". Retrieved from Internet: <https://www.youtube.com/watch?v=4BySUXfs-3E> (Year: 2010).*

"How to Convert Wesite Visitors to Facebook Likes." "Archived Apr. 4, 2011. Web Jun. 12, 2014.http://searchengineland.com/how-to-convert-websites-visitors-to-facebook-likes-70545".

How can I add a Facebook like"button for my fan page to my campaigns." Archived Feb. 11, 2011. Web. Jun. 12, 2014.

Jeff Wong Design. Archived Apr. 16, 2011. Web Jun. 12, 2014. http://jeffwongdesign.com.

How to Put Your Blog Name in AddThis Menu. Archived Jun. 5, 2011. Web Jun. 12, 2014. http://www.mybloggerticks.com/2011/06/how-to-put-your-blog-name-in-menu.html.

Addthis Toolbox Demo—Archived Sep. 24, 2011. Https://web.archive.org/web201109240152454.

"WordPress Plugin: Add Twitter Facebook Google Plus One Social Share (https://web.archive.org/web/20111016182932/http://www.coolajax.net/tutorial_images/13135772953.jpg, archived Oct. 16, 2011), hereinafter WordPress."

Mohammad Mustafa Ahmedzai "How to Put Your Blog Name in AddThis Menu" Jun. 4, 2011, www.mybloggertricks.com/2011/06/how-to-put-your-blog-name-in-menu.html.

"AddThis Labs Floating Vertical Bar Demo." "Archived Oct. 30, 2011. https://web.archive.org/web/20111030072617/http:l/www.addthis.com:80/labs/floating-vertical-bar (Year: 2011)".

* cited by examiner

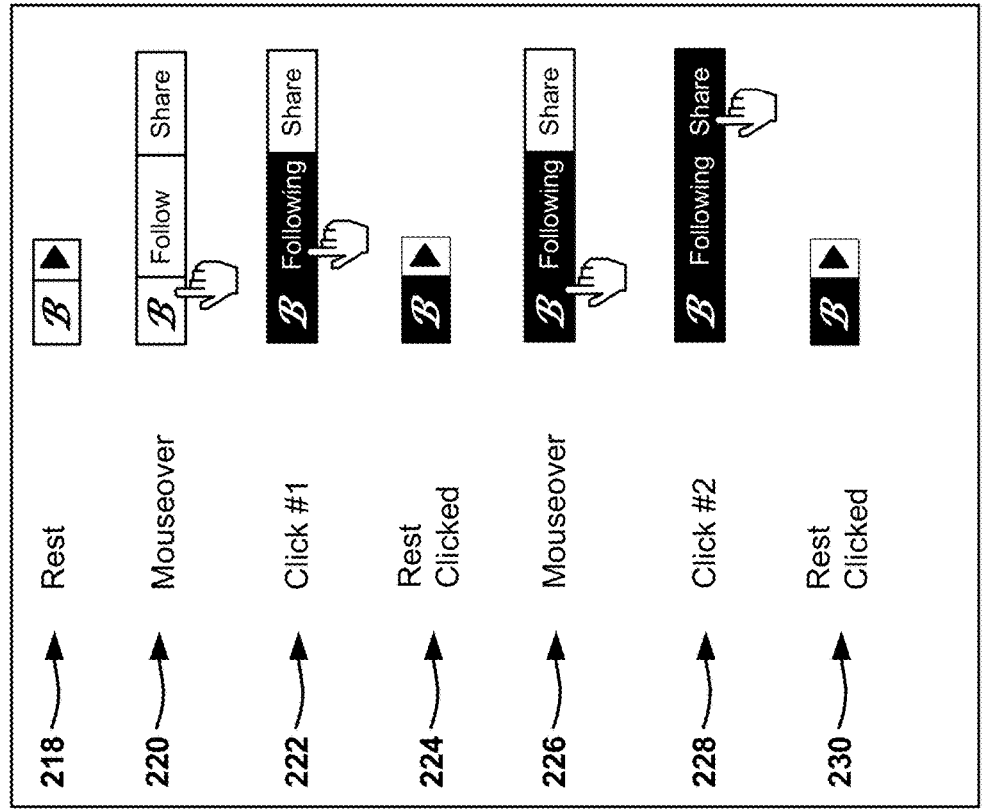
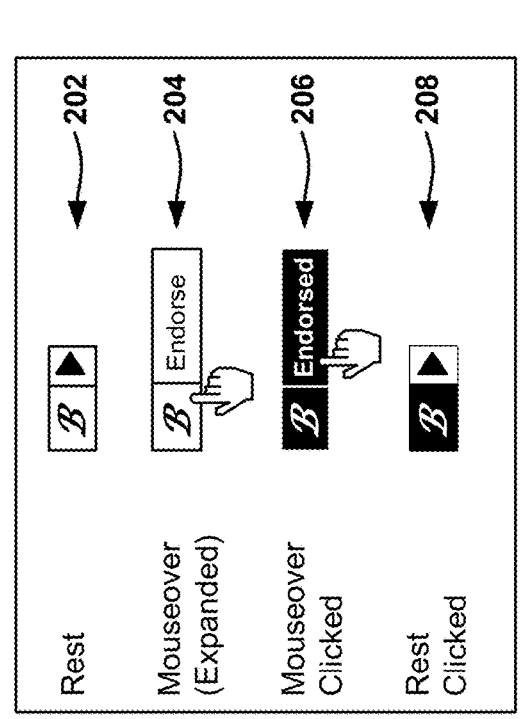
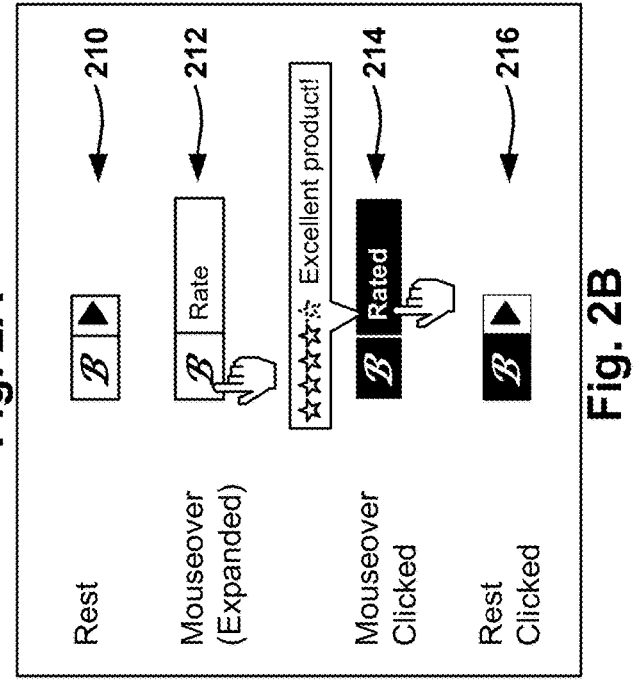
Fig. 2A
Fig. 2B
Fig. 2C

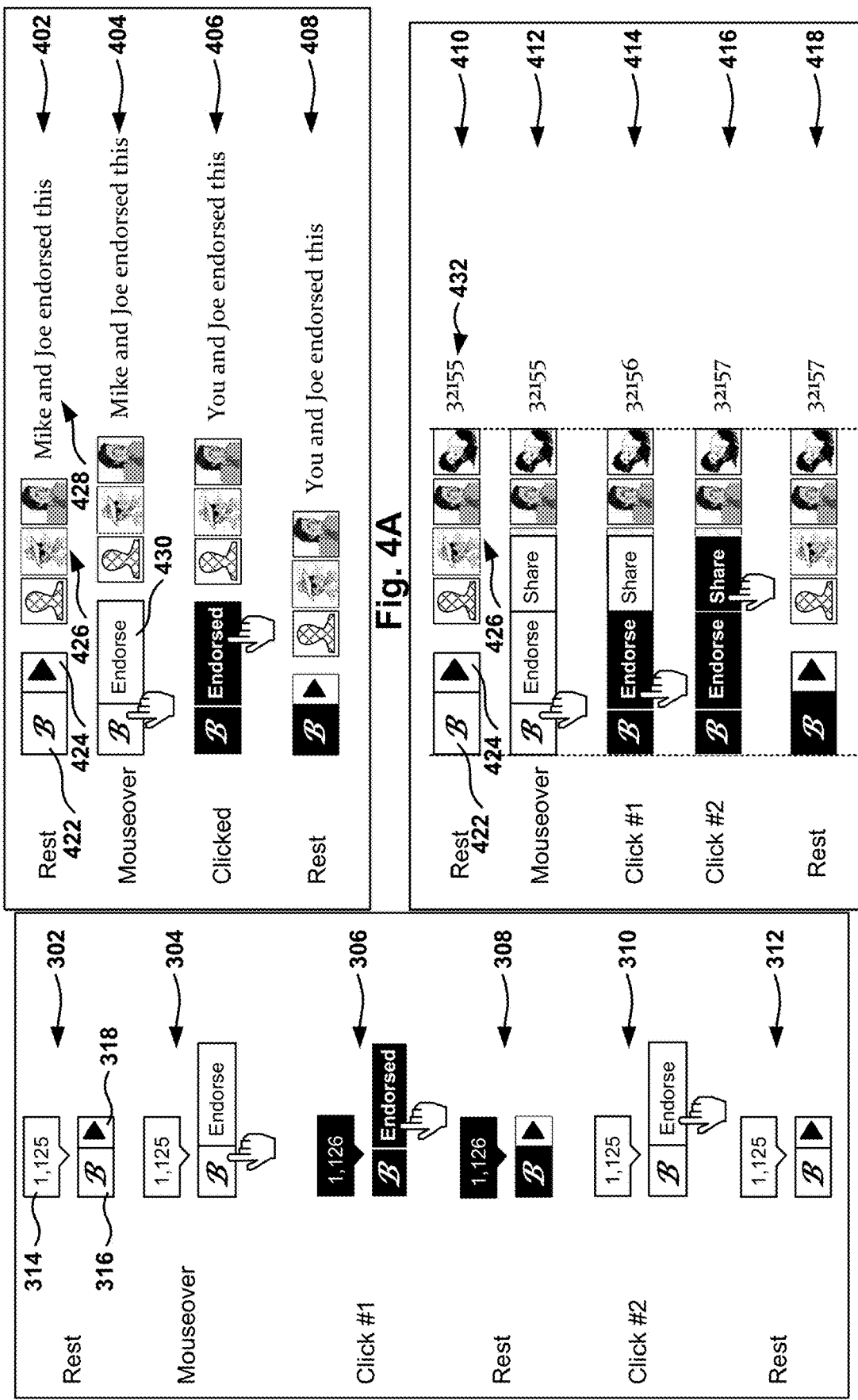

| Item | Type | Owner | Endorsed | Shared | Followed | Reviews | Endorsed Home | Total | Search | Social Network | Site 1 | Site 2 | Site 3 | ... |
|---|---|---|---|---|---|---|---|---|---|---|---|---|---|---|
| Corp.com | Website | Corp | 10245 | 2564 | 110 | 2501 | 78451 | 93871 | 1250 | 25412 | 75 | 7125 | 368 | |
| Announcement | Post | Corp | 458 | 35 | 56 | 487 | | 1036 | 15 | 845 | | | 15 | |
| Ad | Advrt. | Corp | 1241 | 215 | 89 | 301 | 147 | 1993 | 147 | 256 | | | 1147 | |
| Jill's post | Post | Jill Black | 25 | 7 | 6 | | | 38 | | 38 | | | | |
| Jill's review | Review | Jill Black | 89 | 1 | | 14 | | 104 | | 104 | | | | |
| Article | News | Agency | 125 | 1489 | | 451 | | 2065 | 17 | 999 | | 125 | | |
| Joe comment | Comment | Joe Hill | 5 | | | | | 5 | | 5 | | | | |
| ... | | | | | | | | | | | | | | |

Fig. 6

MULTI-FUNCTION GRAPHICAL USER INTERFACE BUTTON

CLAIM OF PRIORITY

This application is a continuation application of U.S. patent application Ser. No. 15/790,378 filed Oct. 23, 2017, which is a continuation of U.S. patent application Ser. No. 13/648,173, filed on Oct. 9, 2012, which claims benefit of Provisional Patent Application No. 61/566,517, filed Dec. 2, 2011, the entire contents of both are hereby incorporated by reference herein.

BACKGROUND

The communication capability provided by social networks has opened forms of communication in today's society, making it easier for people to communicate with each other, as well as providing vehicles of communications between people and businesses or other community groups. As people's interest in using social networks for communication has grown, so have the opportunities for social interaction.

At first, social interactions were performed within the context of a social network, but later users were given additional options to perform social operations in other websites. For example, users were able to select an option in a company's website to indicate an affiliation of the user with the company. This affiliation could be shared with other users of the social network so friends of the user can obtain social information regarding the company.

However, as the number of possibilities to perform social actions has grown, some users have been confused about the use of the different choices. In addition, Graphical User Interfaces become more and more crowded with the increase in the number of options.

Considering that the number of social networks and options for social interaction keep growing, publishers that wish to give users more options for performing social actions face the problem of creating interfaces that can accommodate one or more social networks and multiple options for social interaction.

SUMMARY

Embodiments of the disclosure provide methods, systems, and computer programs for implementing a multi-function button in a Graphical User Interface (GUI). It should be appreciated that the present embodiments can be implemented in numerous ways, e.g., a process, an apparatus, a system, a device or a method on a computer readable medium. Several embodiments are described below.

In some implementations, a method includes an operation for presenting a button in a compact state when a mouse cursor is away from the button. The button in the compact state is displayed in a first button format when options associated with the button are in an unselected state, and in a second button format when at least one option has been selected. The options are hidden when the button is presented in the compact state. The button is presented in an expanded state when the mouse cursor is over the button, where unselected options are presented in a first option format and selected options are presented in a second option format. Selection of any option is enabled while the button is in the expanded state, and at least one operation of the method is executed through a processor.

These and other embodiments can include one or more of the following features.

The method further includes incrementing a counter associated with the button every time an option from a group of options in the plurality of options is selected, where the group of options includes two or more options; and decrementing the counter when an option that had been selected is unselected.

The method further includes receiving a selection of a first option that had previously been selected; and changing the first option from selected to unselected upon receiving the selection.

The method further includes detecting selection of a second option from the plurality of options; incrementing a counter associated with the button in response to the second option being selected; detecting selection of the second option a second time; and decrementing the counter when the second option is selected the second time.

The button in a compact state includes a graphic and a symbol associated with expansion.

The button in the expanded state includes the graphic, and a selection area for each of the options.

The button in a compact state includes a graphic, a value of a counter, and a symbol associated with expansion.

The button in a compact state includes a graphic and one or more user icons, each user icon being associated with a user in a social network, where the button in the expanded state includes the graphic, a selection area for each of the options, and the one or more user icons.

The button in the compact state includes a graphic and one or more user icons, each user icon being associated with a user in a social network, where the button in the expanded state includes the graphic, and a selection area for each of the options, the selection area being placed above the one or more user icons.

The plurality of options is selected from a group consisting of endorse, review, follow, share, rate, buy, or join.

In some implementations, a computer program embedded in a non-transitory computer-readable storage medium, for a graphical user interface (GUI), when executed by one or more processors, includes program instructions for presenting a button in a compact state when a mouse cursor is away from the button, the button being presented in the GUI on a display. The button in the compact state is displayed in a first button format when a plurality of options is in an unselected state and in a second button format when at least one of the options from the plurality of options has been selected. Further, the plurality of options is hidden when the button is presented in the compact state. The computer program further includes program instructions for presenting the button in an expanded state when the mouse cursor is over the button, the expanded state including a presentation of the plurality of options where unselected options are presented in a first option format and selected options are presented in a second option format. In addition, the computer program includes program instructions for enabling selection of any option from the plurality of options while the button is in the expanded state.

These and other embodiments can include one or more of the following features:

The computer program further includes program instructions for presenting the button in an expanded state includes placing the mouse cursor over a default option.

The computer program further includes program instructions for providing a button programming page to configure the plurality of options in the button; and program instructions for creating program instructions for implementing the button in a webpage based on the options configured in the button programming page.

The program instructions for implementing the button, when executed by one or more processors, interface with a social network server.

The computer program further includes program instructions for incrementing a counter associated with the button every time an option from a group of options in the plurality of options is selected, wherein the group of options includes two or more options; and program instructions for decrementing the counter when an option that had been selected is unselected.

In some implementations, a computer implemented method includes an operation for presenting a button in a compact state when a mouse cursor is away from the button, the button being presented in a Graphical User Interface (GUI) on a display. The button in the compact state is displayed in a first button format when a plurality of options are in an unselected state and in a second button format when at least one of the options from the plurality of options has been selected, where the plurality of options is hidden when the button is presented in the compact state. In addition, the method includes an operation for presenting the button in an expanded state when the mouse cursor is over the button. The expanded state includes a presentation of the plurality of options where unselected options are presented in a first option format and selected options are presented in a second option format. Selection of any option from the plurality of options is enabled while the button is in the expanded state, and a counter associated with the button is incremented when the option is selected. At least one operation of the method is executed through a processor.

These and other embodiments can include one or more of the following features:

The method further includes detecting selection for a second time of an option previously selected for a first time; and decrementing the counter in response to detecting the selection for a second time.

The button in a compact state includes a graphic, a symbol associated with expansion, one or more user icons, and a text message with information about a state of the button.

The button in a compact state includes a graphic, a symbol associated with expansion, and a counter situated above the graphic and the symbol, wherein the button in the expanded state includes the graphic, the counter, and a selection area for each of the options, the selection area being situated to a right of the graphic.

The operations of the method are performed by a computer program when executed by one or more processors, the computer program being embedded in a non-transitory computer-readable storage medium.

In some implementations, a computer implemented method includes an operation for presenting a button in a Graphical User Interface (GUI) on a display. The button is displayed in a first button format when a plurality of options are in an unselected state and in a second button format when at least one of the options from the plurality of options has been selected. Further, the method includes another operation for presenting the plurality of options, wherein unselected options are presented in a first option format and selected options are presented in a second option format. Further, selection of any option from the plurality of options is enabled, where at least one operation of the method is executed through a processor.

These and other embodiments can include one or more of the following features:

The method further includes incrementing a counter associated with the button every time an option from a group of options in the plurality of options is selected, where the group of options includes two or more options; and decrementing the counter when an option that had been selected is unselected.

The method further includes receiving a selection of a first option that had previously been selected; and changing the first option from selected to unselected upon receiving the selection.

The method further includes detecting selection of a second option from the plurality of options; incrementing a counter associated with the button in response to the second option being selected; detecting selection of the second option a second time; and decrementing the counter when the second option is selected the second time.

The button in a compact state includes a graphic and a symbol associated with expansion.

These embodiments may provide one or more of the following advantages: customization of social features, easy implementation for publishers, easy button functionality expansion to add new features, versatility, ability to fulfill the publishing needs for different types of publishers, common look and feel, brand promotion, etc.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 2A-2C illustrate different embodiments of a multi-function button in a Graphical User Interface (GUI).

FIG. 3 shows a GUI button with a counter display, according to one embodiment.

FIGS. 4A and 4B show embodiments for multi-function buttons that include user icons.

FIG. 6 is a database storing button-related information, according to one embodiment.

DETAILED DESCRIPTION

The following embodiments describe methods, systems, and computer programs for implementing a multi-function button in a Graphical User Interface (GUI). The multi-function button includes a cursor over (e.g. hover) feature where the button expands to include one or more social action options. The use of a multi-function button provides a unified user interface that preserves social network branding and entices uses to interact.

It will be apparent, that the present embodiments may be practiced without some or all of these specific details.

Figure 1:
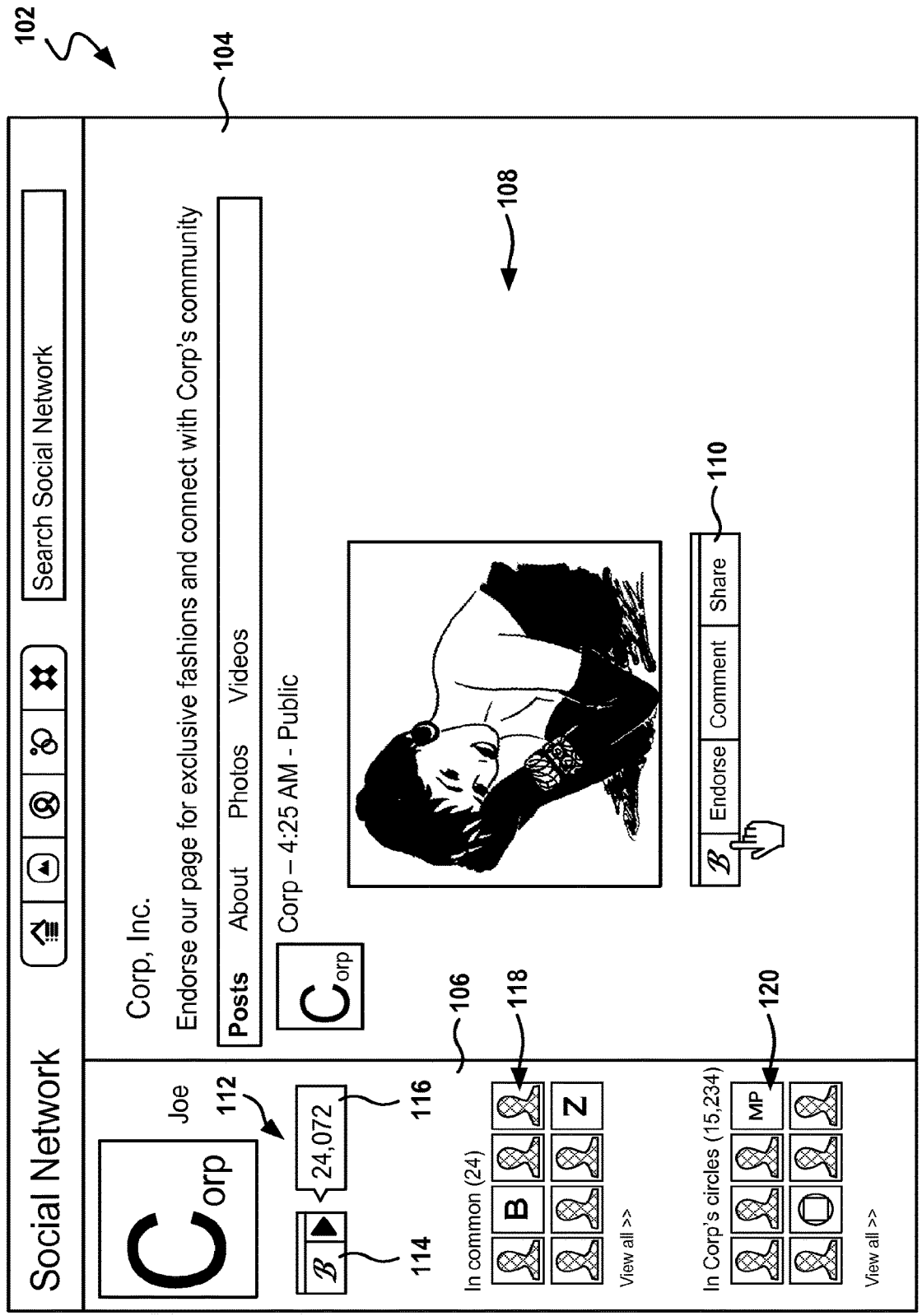
FIG. 1 shows a webpage in a social network that includes multi-function buttons, according to one embodiment.

FIG. 1 shows a webpage in a social network that includes multi-function buttons, according to one embodiment. In the middle panel 104, posts from the entity are presented to the viewer, and on the left panel 106, an icon associated with the entity and the name of the entity are presented. In addition, an endorsement button 112 gives the viewer an option for endorsing the entity associated with the profile page. Button 112 includes icon 114 with an expansion indicator (right pointing triangle) and counter 116.

Button 112 is a multi-function button that expands when the cursor is placed over button 112, as described in more detail below with reference to FIGS. 2A-4B. Counter 116 provides information about the number of users that have endorsed this entity or that have performed other social actions related to this entity. In some implementations, the profile page of a person does not include endorsement button 112. In some implementations, the social network allows for the endorsement of real people, and an endorsement button is available to endorse people.

Profile page 102 also includes information about users 118 in the user's circles (e.g., associated with the user in the social network) that are also following this entity, e.g., users "in common" following this entity. As described herein, a user is following an entity in the social network when the user authorizes the entity to send electronic messages on the social network to the user.

This information about users in common can help the entity improve its corporate image by showing related users that also are associated with the entity. In addition, information 120 is provided about users or entities of the social network that are in the entity's circles.

Middle panel 104 includes a stream of posts related to the entity. For example, post 108 includes a fashion picture posted by the entity as part of its marketing communications. Below post 108, the social network provides a multi-function button 110 that allows the viewer to perform social actions related to the post. FIG. 1 shows button 110 when the cursor is over the button, also referred to herein as a mouseover or a mouse hover, causing the multi-function button to change the presentation format by expanding and showing features that may not be available when the mouse is not over the button. In some implementations, the multi-function button 110 is provided for all posts and comments in the user's stream, while in some implementations, the multifunction button 110 is provided in a subset of posts (e.g. some posts may include the multifunction button while other posts may not include the multifunction button).

When button 110 is in the expanded state, one or more options are provided to the user to perform social actions. For example, in the embodiment of FIG. 1, button 110 provides options for endorsing, commenting, or sharing the post in the social network. If the viewer selects, e.g., clicks, on one of the options, the corresponding action will be performed, which may include an operation to add additional information, e.g., entering the text for the post. For example, if the user clicks on "comment" an input area will be provided to the user to enter the comment, and once the comment is entered the comment may be posted below post 108.

If the cursor is moved away from button 110, the presentation of the button changes, and the options are not be visible (e.g., the options are hidden) to the viewer until the viewer places the mouse cursor over the button one more time. In some implementations, the options are still visible to the viewer when the cursor is away from button 110.

Figure 5:
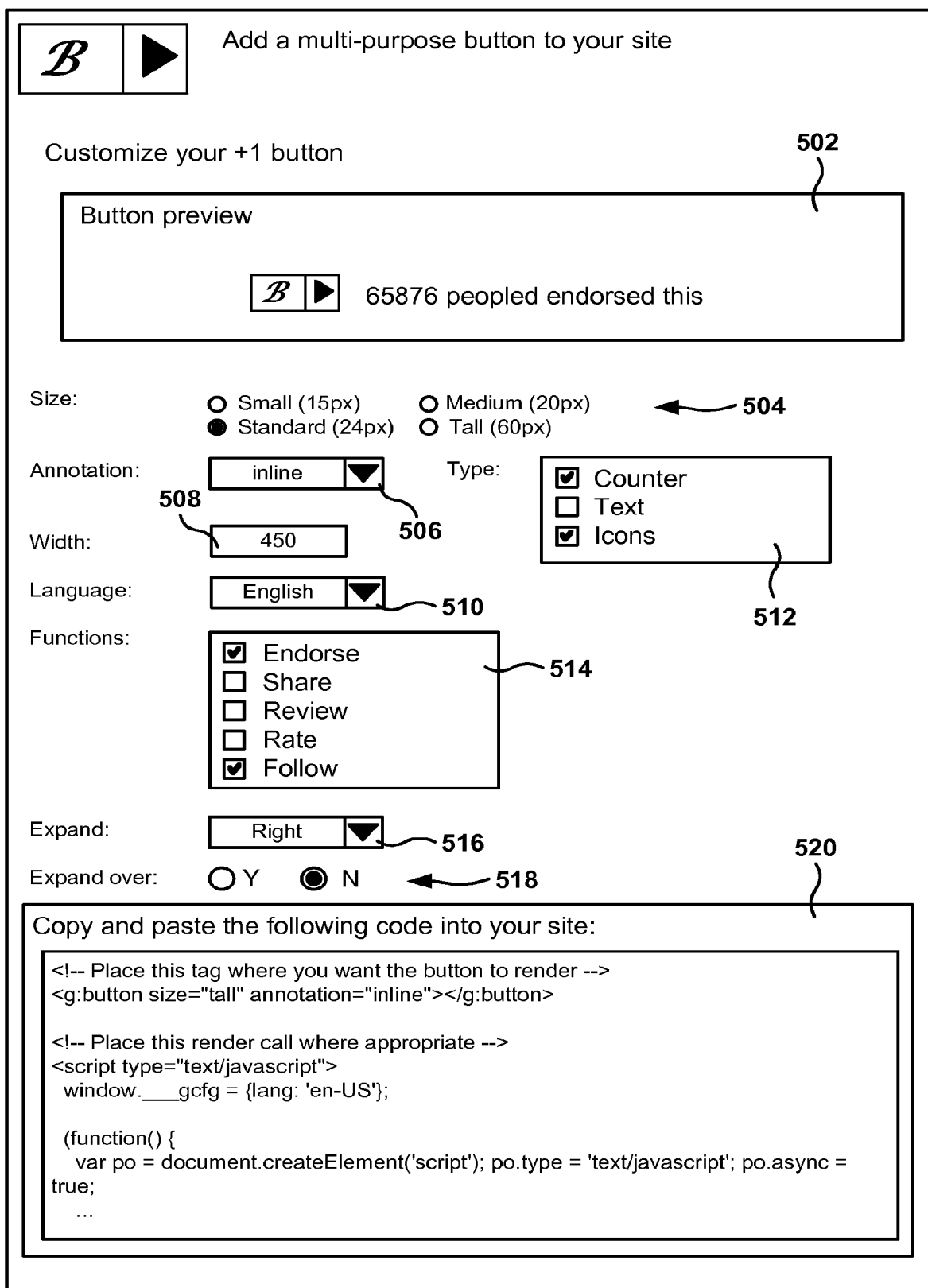
FIG. 5 shows an interface for creating programming instructions that implement a multi-function button in a publisher's website, according to one embodiment.

Although multi-function buttons 112 and 110 are presented in FIG. 1 in the social network page, the multi-function buttons may also be added to other websites not in the social network. A publisher of a website has the option of adding multi-function buttons to her website, allowing the visitors to the publisher's website to perform social-related actions while in the publisher's website. For example, a user can endorse the publisher and the counter associated with the number of endorsers of the publisher's website will be incremented, reflecting the level of popularity of the website. In another example, a user may click on the option in the multi-function button to start following the publisher's company in the social network (e.g., adding the publisher's company to the user's circles). FIG. 5, described in more detail below, provides an interface for creating buttons to be added to publishers' websites.

FIGS. 2A-2C illustrate different embodiments of a multi-function button in a Graphical User Interface (GUI). Embodiments provide multi-function buttons that can be placed on social networks or in other websites that want to provide social network functionality. Additionally, the multi-function button is a versatile button that provides a plurality of options configurable by the publisher. For example, the button may offer 1, 2, or more options when the viewer places the cursor over the button. Some publishers may choose to provide only one option (e.g., endorse), while other publishers may provide a wider functionality (e.g., endorse, review, and share).

In addition, the versatile button provides for the easy addition of new options that may be available in the future. Since the area occupied by the button may be set to a fixed amount of pixels, adding functionality does not require the redesign of a website. When a new option is added to the button, the button appears the same while the mouse cursor is away from the button, but when the viewer places the cursor over the button, the new option will be visible to the user, together with the other options.

In some implementations, the multi-function button presents a different appearance when the mouse cursor is over the button (e.g., hover), than when the cursor is away from the button. When the cursor is hovering over the button, one or more options to perform social actions are presented to the viewer. In some implementations, these options are hidden to the viewer when the cursor is not hovering over the button.

For description purposes, it is referred to herein as a compact state, or a rest state, as the state of the button when the mouse cursor is away from the button. An expanded state, or a mouseover state, or a hover state, is the state of the button when the cursor is on the button. In some implementations, the format of the button presented to the viewer when the button is in the compact state is different from the format presented when the button is in the expanded state. In some implementations, the format is the same when the button is in the compact state or in the expanded state.

FIG. 2A illustrates the behavior of a button providing one option to the viewer. When the button is in the rest state 202, the button presents a first format, which includes an icon (e.g., the graphic including the letter B) and a right triangle that indicates that the button is expandable. In some implementations, the button includes the icon but does not include the expansion indicator.

When the viewer places the cursor over the button, the button is presented in the expanded state 204, which includes the same icon and the option to endorse an item associated with the button (e.g., a company, a post, a movie, etc.).

When the viewer clicks on the option, the button 206 is presented in a different format, which includes a different shading for the icon and a different shading for the exercised option. The different shading indicates to the viewer that the option has been selected, in this case, that the endorsement from the viewer has been completed. Further, after the viewer moves the cursor away from the button, the button 208 is presented in the rest state. However, the icon is presented with different shading than the button 202, because the user has already performed the social action associated with the button. In other words, a shaded icon means that the option has been executed, and a non-shaded icon means that the user has not performed any actions related to this button.

It is noted that although embodiments described herein utilize different shading for distinguishing button state and option state, other visual indicators, (e.g., distinctive formats), may be utilized, e.g., different graphics, different fonts, different character attributes (e.g., bold, italics, underline, size, etc.), different prompts, different text, etc.

In some implementations, the options presented in a multi-function button may include one or more of endorse, review, share, follow (e.g., add to the user's circles), rate, buy, join, etc. In some implementations, when a user endorses an item, the social network increments a counter associated with the item. As more users endorse the item, the counter growth reflects the increasing popularity of the item. In some implementations, a user may withdraw her endorsement by clicking on the endorsement option a second time, which causes the counter to be decremented by one.

When a user reviews an item, the user enters a description of her opinion on the item, and the review is made available to others in the social network. In some implementations, the reviewer has the option to make the review available to everyone or only to users specified by the reviewer. When a user shares an item, a reference to this item is posted in the user's stream in the social network. In addition, the user has the option to include a comment with the reference to the item.

When the user selects the follow option, the user starts following the associated person or entity in the social network. In some implementations, this causes the associated person or entity to be added to one or more circles of the user in the social network. In addition, when the user rates an item, the user provides some value within a scale or range of possible values to show the user's opinion of the item. In some implementations, the rating system includes given the item from 1 to 5 stars, but other ratings are possible, e.g., rating from 1 to 10, choosing from good, neutral, or bad, etc.

It should be appreciated that the embodiments illustrated herein may utilize different formats, other options, etc. The embodiments described herein should therefore not be interpreted to be exclusive or limiting.

FIG. 2B illustrates the behavior of a button that provides a rate option. The button at rest 210 presents an icon and the expansion symbol, and the expanded state 212 includes the icon and an option to rate an item. In some implementations, when the viewer clicks on the "Rate" option of button 214, a pop-up window enables the user to select how many stars to give to the item, and to enter other related information, e.g., a comment about the item (e.g., "Excellent product!"). In the embodiment of FIG. 2B, the user has clicked on the 4th star, given the item a four-star rating, and the option is presented with dark shading and the text "Rated." In some implementations, when the cursor is over the "Rated" option of button 214, a bubble is presented with the rating (4 out of 5 stars) and the other items associated with the rating, e.g., the comment from the reviewer. In some implementations, the rating is always visible and shown together with the button when the button is at rest. Four stars are presented with a solid format, while the fifth star (the un-selected one) is presented in a different format to indicate that the maximum number of stars was not awarded. After the user has rated the item, the rest state 216 shows the icon with a different shading to indicate that the user has rated the item.

In some implementations, the format of an option in the expanded state varies according to the current state of the option. In other words, each value associated with an option causes the option to be presented in a different format. In the example of FIG. 2A, the option "Endorse" is presented with light shading when the user has not endorsed the item yet, and the option "Endorse" is presented with darker shading after the user has endorsed the item. Every time the user clicks on "Endorse" the shading changes, indicating that the user is endorsing or withdrawing the endorsement for the item.

In some implementations, the options presented for the button while in the expanded state vary dynamically as a function of the past history of the use of the bottom or depending on current conditions. For example, a user may be offered a first option (e.g., endorse) initially, but after the user selects the first option (e.g., the user endorses the item), the next time that the user accesses the bottom a second option (e.g. share) is presented to the user, where the second option was not initially made available to the user. In some implementations, logic associated with the button is provided, where the logic is operable to select which options to present to the user based on the past history and the current status of the user. For example, if the logic determines that a user rarely, if ever, uses the option to "follow" a company, the button logic may hide the follow option until a user endorses the item, or the button logic may present the "follow" option as the last option (e.g., farthest to the right).

FIG. 2C illustrates the behavior of a button with two options. In the rest state 218, the button is presented with the icon and the expansion indicator. When the button is in the expanded state 220, two options are included: follow and share. Initially, neither of the two options have been selected, and the options are presented with a light shading. The icon is presented also with a light shading to indicate that no option has been selected.

After the viewer clicks on the follow option, button 222 shows an icon with the dark shading and the "Following" option also with a darker shading. The follow option also has changed the text associated with the option to "Following" to indicate that the user is now following the associated person or entity. This example shows that the formatting change when the option is selected is not limited to shading, and other format changes may also indicate the selection, e.g., changing the text (e.g., "Follow" to "Following"), or even changing a graphic.

After selecting the follow option, the user moves the cursor away from the button, causing the multi-function button to be presented in the rest state 224, which includes an icon with darker shading and the expansion indicator. Button 224 has an icon with a darker shading than button 218, because button 224 denotes that an option has already been selected.

When the user places the cursor over the button again, button 226 is shown with the same format as button 222, when the user clicked on the follow option. After the user clicks on the "Share" option, button 228 shows the icon, and both options present the darker shading to indicate that both options have been selected. When the cursor is moved away again from the bottom, button 230 is presented with a similar format to button 224, indicating that at least one of the options has been selected (both options have been selected in this case).

In some implementations, the button in the compact state can be presented in two different formats. The first format is used when none of the options associated with the button has been selected, e.g., the options are in an unselected state. The second format is utilized when at least one of the options associated with the button has been performed. For example, if the user has endorsed a company, the button in the compact state will present different shading. In some implementations, when the button is in the compact state the options associated with the button are hidden from the user, and the options are presented when the button is in the expanded state.

In some implementations, the second format is utilized when all the options associated with the button have been performed. This indicates to the user that more options may be performed utilizing this button.

The expanded button may also present different formatting options. In some implementations, the icon presented in the expanded state presents a first shading when none of the options have been executed, and a second different shading when at least one of the options has been executed. In some implementations, the shading of the icon may have a plurality of possible values, and as the user performs more actions associated with the button, the shading of the icon keeps changing to indicate the execution of the multiple actions. In some implementations, the icon presents a first shading when none of the options have been executed, a second shading when at least one option has been executed but not all options have been executed, and a third shading when all the options have been executed.

In addition, each option presented in the expanded state may also have different formats depending on whether the option has been performed or not. For example, in the embodiment shown in FIGS. 2A-2C options that have not been performed are presented in a lighter shading, while options that have been selected or executed by the user are presented with a darker shading. In some implementations, the shadings may be different, and the embodiments presented are not to be considered limiting.

In some implementations, one or more options associated with the button provided a "toggle" function, which means that a value associated with the option is changed between a first value and a second value every time the user selects the given option. In other words, the option has two different states and the user may select either of the states at any time. For example, if a user clicks on the follow option for the first time, the user will start following an entity in the social network, and if the user clicks the follow option a second time the user will stop following the entity. If the user clicks a third time, the user will start following the entity again, etc. In another example, if the user chooses to endorse the company, the counter associated with the company is increased, and if the user selects the endorsement option again, the endorsement is "withdrawn" from the company causing a decrement in the counter. In other embodiments, the options may have a different number of states, e.g., 3, 4, 10, etc.

Although embodiments have been described utilizing buttons that expanded in size to provide a clicking area to select one or more options, other types of user interfaces are also possible. In some implementations, when the cursor is placed over the button, a pop-up box or pop-up window is presented to the user with features that enable the user to select one or more options and enter information associated with the option, if any (e.g., a review text associated with an item). In some implementations, the expanded estate of the button is not initiated until the user clicks on the button. Therefore, the expanded state is not initiated on hover but on an actual click.

FIG. 3 shows a GUI button with a counter display, according to one embodiment. Button 302 includes icon 316, expansion arrow 318, and bubble counter 314. The bubble counter 314 shows the number of users that have performed a social action on an associated item. It is noted that, in some implementations, a user may perform more than one social action associated with the button, which means that a user may increment the counter multiple times, one time for each option.

When the user places the cursor over the button, the button 304 is presented in an expanded state, which includes an option to perform an endorsement. When the user clicks 306 the "Endorse" option, the formatting of the icon, the option, and the bubble counter changes to have darker shading. In addition, the counter value has been incremented (from 1125 to 1126) because the user has endorsed the item.

When the cursor is moved away from the button, the button is presented in rest state 308, which includes the icon and the counter with the darker shading or background. Therefore, the rest state of the bottom 308 has a different format than rest button 302, to reflect that the item has been endorsed.

After the viewer clicks 310 the endorsed option for a second time, the endorsement is withdrawn from the item, which means that the counter is decreased by one (of course, assuming that in the meantime no other user has endorsed or retired the endorsement from the item), and the shading of the button 310 reverts back to the original format of button 304, because the item is not endorsed anymore by this user. When the cursor is moved away from the button, compact button 312 offers the same appearance as button 302 because there is no endorsement from this user for the item associated with the button.

FIGS. 4A and 4B show embodiments for multi-function buttons that include user icons. FIG. 4A illustrates the behavior of a button which includes social network information. In the rest state, button 402 includes icon 422, expanding indicator 424, one or more user icons 426, and an information text message 428.

When the cursor is over the button 404, the expanding indicator 424 disappears and is replaced by option 430 to enable endorsement of the associated item. As the button expands due to the presence of the endorsed option, the one or more user icons 426 and information text message 428 are displaced towards the right to make room for the endorse option.

After the viewer clicks on the endorsed option, button 406 changes format, where the icon and the option are presented with the darker shading. After the cursor is moved away from button 408, the button goes back to the rest state, but rest button 408 presents a darker icon to indicate that the item associated with the button has been endorsed.

FIG. 4B illustrates a button that confines the area associated with the button to a limited space, which means that when the button is expanded the button does not take additional space on the display. In the rest state, button 410 includes an icon 422, the expanding indicator 424, one or more user icons 426, and counter value 432.

When the cursor is placed on the button, button 412 is presented in the expanded state, but in this embodiment the options are overlaid over the user icons in order to keep the space taken by the button constant. In the example of FIG. 4B, the options "Endorse" and "Share" are presented over two of the user icons, while two other icons are still visible. Button 414 shows the format of the button after the user has clicked the endorse option, and button 416 shows the same button after the user has clicked on the share option. The counter is incremented a first time after the user's selects the "Endorse" option, and incremented a second time after the user selects the "Share" option. This means that one user can perform several social network actions that affect the same counter. In other words, the user has the ability to increment the counter more than once.

After the user moves the cursor away from the button, button 418 is similar to rest button 410, except that button 418 has a different format because the user has performed social actions (e.g., Endorse, Share) associated with the button. By keeping the amount of space (e.g., pixels taken by the button) constant, a web publisher may add new options to the button without having to redesign the website to accommodate a different button footprint.

By utilizing one button to access multiple actions related to a social network, the use of the social network is a simplified for the user and the brand of the social network enhanced by increasing the number of options available to the user, while keeping the complexity of the user interface low. In some implementations, the publisher of the button gets automatic updates to the functionality of the multifunction button without having to reprogram the button. Since the multi-function button utilizes program instructions to invoke a remote procedure on a remote server, updates to the functionality of the button may be performed by changing the functionality in the remote server. The publisher of the button gets automatic upgrades to the multi-function button functionality when the code implementing the button in the server is updated.

In some implementations, when multiples options are presented to the user while in the expanded state, one of the options is a default option. When the cursor is placed on the button, the cursor is placed over the default option. For example, if endorsing is the default option, when the cursor is placed over the button, the cursor is placed over the endorsed option in the expanded button.

In some implementations, a bubble message is provided when the mouse cursor is moved over each of the available options. The bubble message changes for each of the options, and the bubble message provides information related to the option being hovered over.

FIG. 5 shows an interface for creating programming instructions that implement a multi-function button in a publisher's website, according to one embodiment. The configuration page of FIG. 5 includes a plurality of options for adjusting the parameters associated with the multi-function button. Once the user configures the parameters, programming instructions 520 are provided for the user (e.g., HTML code, JavaScript, etc.). When the publisher of a website includes the program instructions 520 in a webpage, the multi-function button is displayed when the webpage is presented to a user.

Preview area 502 gives a preview of what the button will look like when implemented with the current configuration, which includes all the options selected below preview area 502. As the user changes the configuration parameters, preview area 502 changes accordingly to give an idea to the web designer of what the button will look like in a webpage. For example, in the embodiment of FIG. 5 the previews shows that the button includes an icon, and expanding indicator, and a text message indicating how many people have endorsed the corresponding item.

Size parameter 504 enables the user to customize the size in pixels of the height of the button. In some implementations, four options are given to the user: small, medium, standard, and tall. In addition, the user may select via a pull-down menu 506 the type of annotation to be included with the button, if any. In some implementations the options are none, bubble, and in-line, but other options are also possible. In addition, annotation type field 512 enables the publisher to select what type of annotation, e.g., the inclusion of a counter, text, and/or icons.

Width field 508 provides an input area for entering the maximum width of the button. Language field 510 enables the publisher to select the language associated with the button. Function area 514 gives the publisher the ability to select one or more options to be featured in the button. In some implementations, the options that can be selected include endorse, share, review, rate, and follow, but other options are also possible.

Pull-down menu 516 enables the configuration of how the button is expanded when the cursor is over the button. In some implementations, the options in the pull-down menu 516 include one or more of top, bottom, right, or left. In addition, binary parameter 518 defines if the options of the button will be presented over annotations associated with the button or if the annotations will be displaced to one side in order to accommodate the expansion of the button.

It should be appreciated that FIG. 5 illustrates one possible embodiment, but other embodiments are also possible with some variation from the parameters described in FIG. 5. Other embodiments may utilize different fields, options, layouts, pop-up windows, etc. Therefore, the embodiment of FIG. 5 is not to be interpreted to be exclusive or limiting.

FIG. 6 is a database storing button-related information, according to one embodiment. As described above, some implementations allow the user to perform more than one social action that affects the value of a counter. For example, a user may endorse a company, follow the company, add a post in the company's website, enter a review, rate an item, etc. In some implementations, each of the different actions may increase the value of the counter.

In some implementations, a relational database is utilized to determine which actions have been performed affecting the value of the counter, as well as other information e.g., the location (e.g. website) where the social action took place. The relational database includes a row for each item (e.g. company website, news announcement, advertisement, user post, user review, comments, etc.). In each row, the type field defines what kind of item is associated with this row, and an owner field indicates the owner of the item (e.g., a company, a nonprofit organization, a user, etc.). For each row, different fields store the number of users that have performed a particularly social action, e.g., endorsing, sharing, following, adding a review, etc. The total sum of the individual social actions counters affecting a particular item is kept in the field named "Total."

To the right of the "Total" column, there is a plurality of columns indicating where the social actions have taken place. For example, a "Search" field indicates how many times in the social action took place while in the search page. In addition, a plurality of websites have associated columns to keep a number of the times that the social action took place in the corresponding website.

In some implementations, the information from the database of FIG. 6, or a subset of the information thereof, maybe provided to the owner of the item. This way, the publisher of the button gets granular information on how users in the social network are utilizing the button, and how popular are the features provided by the publisher in the website. This enables the publisher to improve and plan marketing strategies, website layouts, social strategies, etc.

Figure 7:
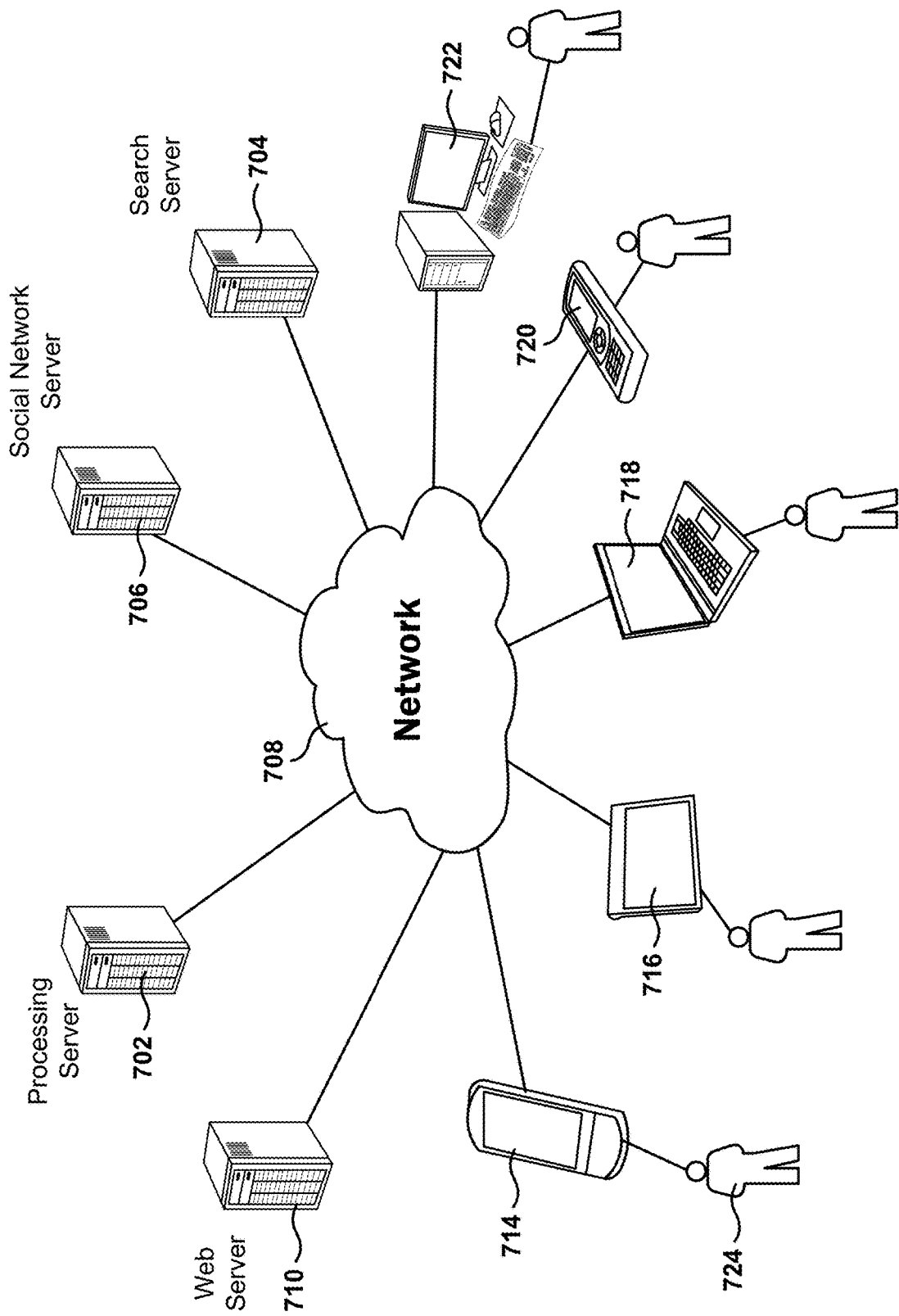
FIG. 7 provides one example architecture of a system that may utilize embodiments described herein.

FIG. 7 provides one example architecture of a system that may utilize embodiments described herein. Users 724 interact with each other in the context of a social network, where users include real people and entities. Each user has an account in the social network, and the account includes at least a user name. In addition, each account includes a profile of the user with additional information about the user, e.g., residence, favorite activities, etc. The user is in control of what information is added to the profile, and what information is shared with others. A user may access the social network through different devices e.g., a smart phone 714, a tablet computer 716, a laptop 718, a mobile phone 720, a personal computer 722, or any computing device that provides access to the Internet. Of course, the illustrated devices are only examples.

In some implementations, social network server 706 delivers services that enable users to interface with each other. The social network provides a site that enables users to define user accounts, which can be accounts for people and entity accounts. Through those accounts, users are able to connect with their friends, group of friends, entities, groups of entities, etc. In some implementations, the relationships established in the social network may be utilized in other contexts and websites. Search server 704 provides Internet search capabilities.

Processing server 702 manages the implementation of the multi-function button by providing interfaces accessible over network 708. Processing server 702 interfaces with web server 710, social network server 706, search server 704, and client devices to perform multi-function button operations. Therefore, when the client device accesses a web server or search server 704, having a multi-function button, the code associated with the multi-function button causes the exchange of electronic messages between the processing server, client device, the Web server, social network server, or the search server to perform the social operations associated with the multi-function button.

In some implementations, the social network provides entities with a specific type of interface for posting messages, communicating, sharing, and generally interacting within the social network. In some implementations, this interface for entities is referred to as "plus pages," indicated by a token, e.g., "+", followed by the name of the entity in the social network (e.g., Acme corporation has a "+Acme" page). Real-persons have "person pages," which are different from plus pages and have different functionality, although some features are common to both plus pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

Other embodiments may utilize different servers, have the functionality of one server distributed over a plurality of servers, have the functionality of two or more servers combined into a single server, have a different amount of user categories in the social network, categorize users by different criteria, but, provide different options for the multi-function etc. The embodiments illustrated in FIG. 7 should therefore not be interpreted to be exclusive or limiting.

Figure 8:
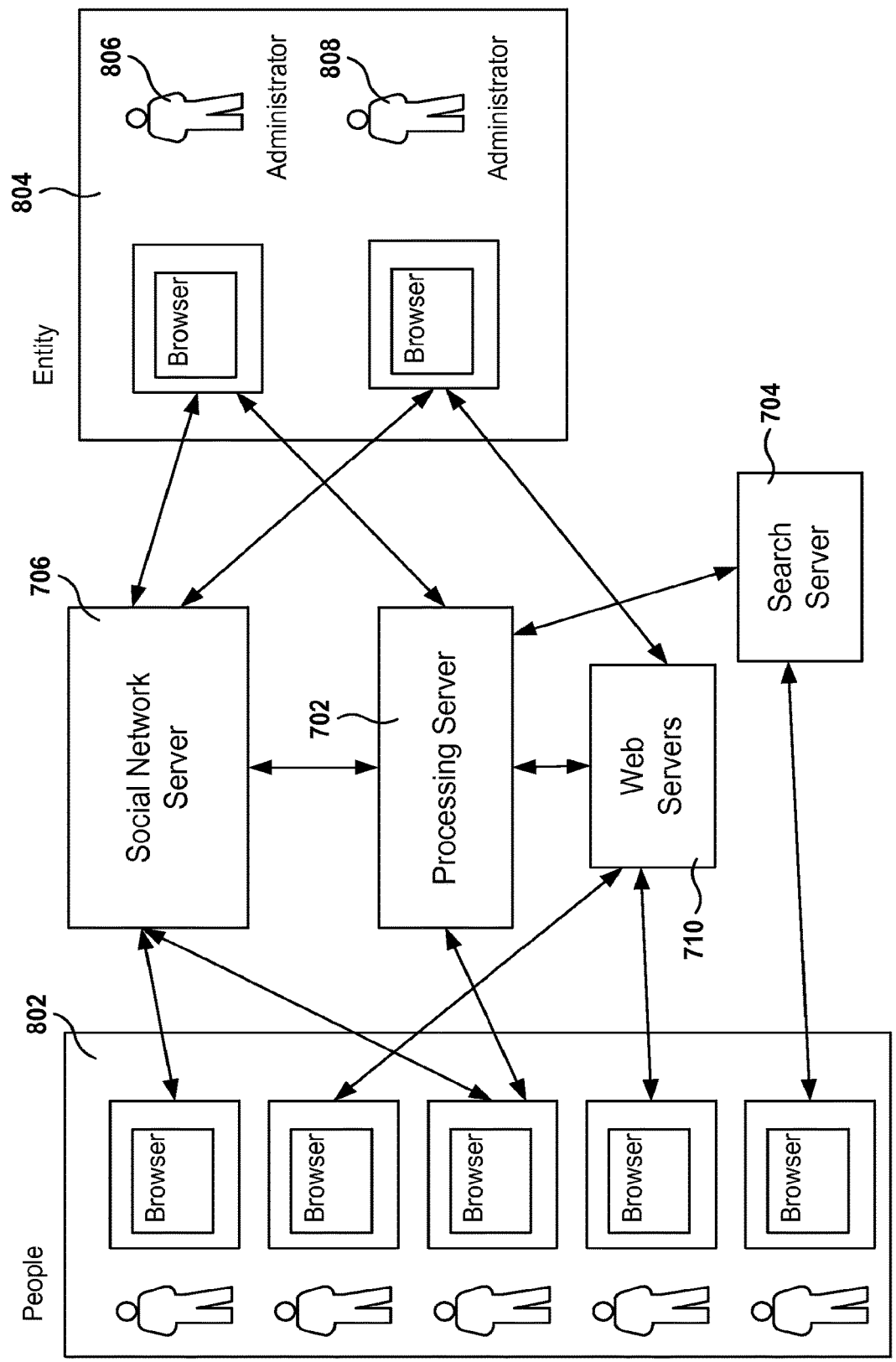
FIG. 8 shows an architecture for implementing embodiments described herein.

FIG. 8 shows an architecture for implementing embodiments described herein. People 802 access the social network 706 utilizing a web browser, or some other similar application (e.g., app in smart phone). Entity 804 includes one or more administrators 806, 808 that access the social network via a network browser or some other similar application or interface provided by the social network.

Processing server 702 manages the implementation of the multi-function button functionality, and exchanges electronic messages with other servers and client devices. When a user performs an action of the button, the browser of the user interfaces with the processing server, or with another server that interfaces with the processing server, to perform the social action.

Processing server 702 interfaces with other servers in the network, e.g., social network server 706, Web servers 710, and search server 704. For example, if the user performs an endorsement of the website by clicking on the button while on the search site, the code in the button will cause the exchange of electronic messages between the browser and processing server 702, directly or indirectly through other servers on the network.

In addition, when a request is made to the social network server 106 to establish a new relationship (e.g., to start following another user), the social network forwards the requests to processing server 702, which determines if the request is authorized or denied. For example, processing server 702 checks if a person may be added to another person's circles, or if a person may be added to an entity's circles. The processing server maintains the list of the possible operations. In some implementations, processing server 702 provides an Application Programming Interface (API), which is utilized by other servers to perform requests from the processing server 702.

It is appreciated that the embodiments illustrated in FIG. 8 may utilize different rules, different servers, combine the functionality of different servers into one server, distribute the functionality of one server among several servers, etc. The embodiments illustrated in FIG. 8 should therefore not be interpreted to be exclusive or limiting.

Figure 9:
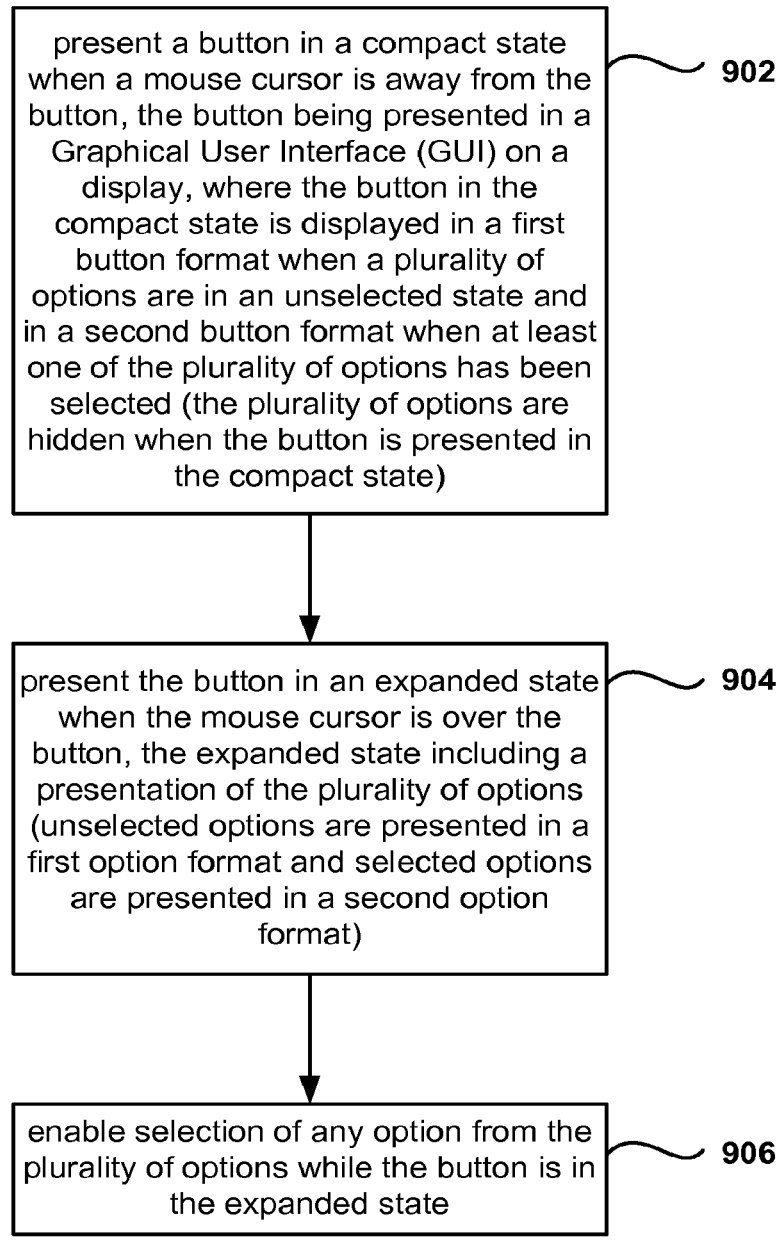
FIG. 9 shows a flowchart illustrating a process for implementing a multi-function button in a Graphical User Interface (GUI), in accordance with one embodiment.

FIG. 9 shows a flowchart illustrating a process for implementing a multi-function button in a Graphical User Interface (GUI), in accordance with one embodiment. In operation 902, the button is presented in the compact state when the cursor is away from the button, the button being presented in a Graphical User Interface (GUI) on a display, e.g., for example, the webpage of FIG. 1. The button in the compact state is displayed in a first button format when a plurality of options is in an unselected state, and in a second button format when at least one of the options from the plurality of options has been selected. Further, the plurality of options is hidden when the button is presented in the compact state.

From operation 902 the method continues to operation 904, where the button is presented in an expanded state when the cursor is over the button (see for example button 220 of FIG. 2C). The expanded state includes a presentation of the plurality of options, where unselected options are presented in a first option format and selected options are presented in a second option format.

From operation 904, the method flows to operation 906 where the method enables the selection of any option from the plurality of options while the button is in the expanded state (see for example button 228 of FIG. 2C, etc.).

Figure 10:
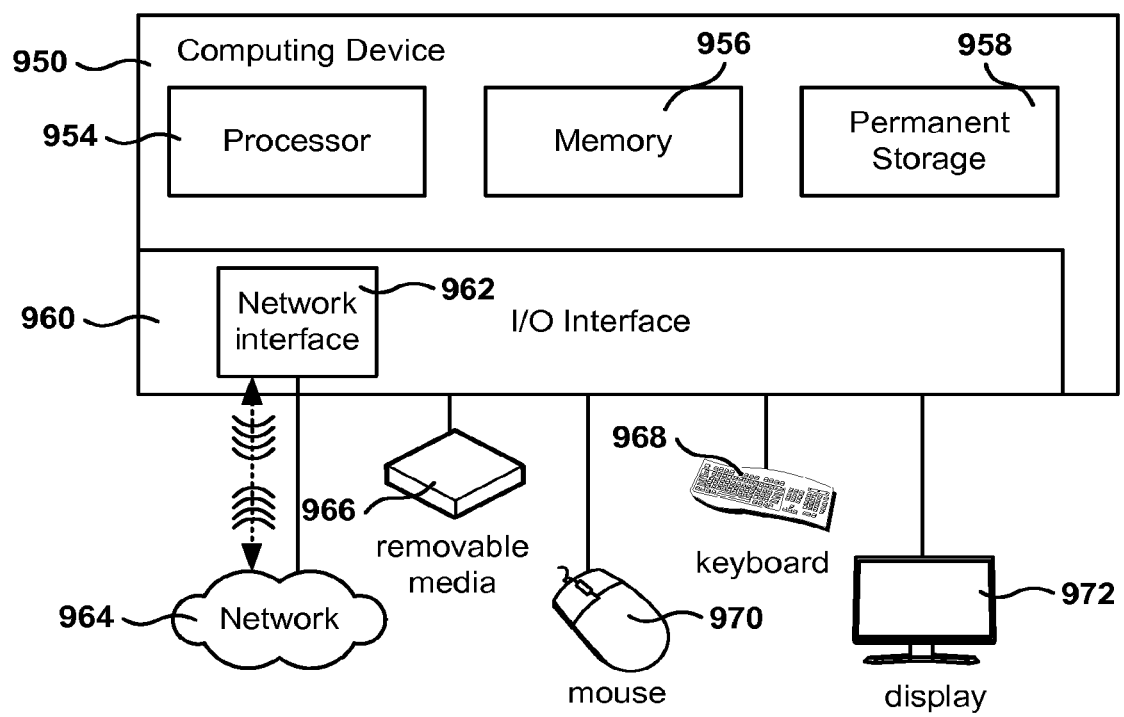
FIG. 10 is a schematic diagram of a computer system for implementing embodiments described herein.

FIG. 10 is a schematic diagram of a computer system for implementing embodiments described herein. It should be appreciated that the methods described herein may be performed with a digital processing system, e.g., a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device e.g., a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments can also be practiced in distributed computing environments where tasks are performed by remote processing devices that are linked through a wired or a wireless network.

Embodiments can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, e.g., processor 954 of FIG. 10. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
presenting, by a processor, a control element in a compact state for display at a first view of a graphical user interface (GUI), wherein
the compact state indicates lack of user input associated with the control element,
the control element in the compact state comprises a first selection area comprising a graphic and text that are available for selection to initiate a presentation of a plurality of options associated with the control element,
the plurality of options associated with the control element is hidden when the control element is presented in the compact state,
the first selection area of the control element in the compact state is displayed in a first format responsive to the plurality of options being in an unselected state,
the control element in the compact state is associated with a counter indicating a number of users that have endorsed an entity associated with the control element,
the counter associated with the control element is incremented to reflect a selection of an option of the plurality of options and decremented to reflect an unselection of the option, and
the counter is distinct from the graphic and the text;
responsive to a selection of the first selection area of the control element, presenting, by the processor, the control element in an expanded state for display at the first view of the GUI, wherein
the control element in the expanded state is presented with the plurality of options available for selection,
the plurality of options comprising a default option and one or more non-default options,
the control element in the expanded state comprises the graphic, the text, and a second selection area for each of the plurality of options,
the control element in the expanded state is configured to present a first visual indicator responsive to a first selection of a first option of the plurality of options,
the control element in the expanded state is configured to present a second visual indicator different than the first visual indicator responsive to a second selection of the first option and a second option of the plurality of options; and
modifying, by the processor, a presentation of the control element from the expanded state to the compact state, wherein
the modified presentation of the control element is provided for display at the first view of the GUI,
the first selection area of the control element in the compact state is displayed in a second format indicative of a social action option, selected from the plurality of options, to endorse a post within a social network, and the first selection area of the control element in the compact state is displayed in the second format in the GUI adjacent to the post generated within the social network.

2. The method of claim 1, further comprising:

responsive to a first user input indicating a hover above the option of the plurality of options of the control element in the expanded state, providing a first text message that corresponds with the option and that provides information related to the option.

3. The method of claim 2, wherein the option of the plurality of options is the first option, the method further comprising:

responsive to a second user input indicating a hover above the second option of the plurality of options of the control element in the expanded state, providing a second text message that corresponds to the second option and that provides information related to the second option.

4. The method of claim 1, wherein in the expanded state, one or more of the plurality of options overlay content presented in the GUI.

5. The method of claim 1, wherein the option of the plurality of options is the first option, wherein the first selection area of the control element in the compact state is displayed in a third format indicative of the second option from the plurality of options having been selected, wherein the third format is different from the first format and the second format.

6. The method of claim 1, wherein the control element is provided for the post in a user feed.

7. The method of claim 1, wherein the control element is provided for display with content of a social network platform.

8. The method of claim 1, wherein in the second format the graphic of the control element is replaced by a new graphic.

9. A non-transitory computer-readable storage medium comprising program instructions that, when executed by one or more processors, cause the one or more processors to perform a method comprising:

presenting, by the one or more processors, a control element in a compact state for display at a first view of a graphical user interface (GUI), wherein the compact state indicates lack of user input associated with the control element, the control element in the compact state comprises a first selection area comprising a graphic and text that are available for selection to initiate a presentation of a plurality of options associated with the control element, the plurality of options associated with the control element is hidden when the control element is presented in the compact state, the first selection area of the control element in the compact state is displayed in a first format responsive to the plurality of options being in an unselected state, the control element in the compact state is associated with a counter indicating a number of users that have endorsed an entity associated with the control element, the counter associated with the control element is incremented to reflect a selection of an option of the plurality of options and decremented to reflect an unselection of the option, and the counter is distinct from the graphic and the text;

responsive to a selection of the first selection area of the control element, presenting the control element in an expanded state for display at the first view of the GUI, wherein the control element in the expanded state is presented with the plurality of options available for selection, the plurality of options comprising a default option and one or more non-default options, the control element in the expanded state comprises the graphic, the text, and a second selection area for each of the plurality of options, the control element in the expanded state is configured to present a first visual indicator responsive to a first selection of a first option of the plurality of options, the control element in the expanded state is configured to present a second visual indicator different than the first visual indicator responsive to a second selection of the first option and a second option of the plurality of options; and modifying a presentation of the control element from the expanded state to the compact state, wherein the modified presentation of the control element is provided for display at the first view of the GUI, the first selection area of the control element in the compact state is displayed in a second format indicative of a social action option, selected from the plurality of options, to endorse a post within a social network, and the first selection area of the control element in the compact state is displayed in the second format in the GUI adjacent to the post generated within the social network.

10. The non-transitory computer-readable storage medium of claim 9, further comprising:

responsive to a first user input indicating a hover above the option of the plurality of options of the control element in the expanded state, providing a first text message that corresponds with the option and that provides information related to the option.

11. The non-transitory computer-readable storage medium of claim 10, wherein the option of the plurality of options is the first option, the method further comprising:

responsive to a second user input indicating a hover above the second option of the plurality of options of the control element in the expanded state, providing a second text message that corresponds to the second option and that provides information related to the second option.

12. The non-transitory computer-readable storage medium of claim 9, wherein in the expanded state, one or more of the plurality of options overlay content presented in the GUI.

13. The non-transitory computer-readable storage medium of claim 9, wherein the option of the plurality of options is the first option, wherein the first selection area of the control element in the compact state is displayed in a third format indicative of the second option from the plurality of options having been selected, wherein the third format is different from the first format and the second format.

14. A system comprising:

a memory; and a processor, coupled to the memory, to:

present a control element in a compact state for display at a first view of a graphical user interface (GUI), wherein the compact state indicates lack of user input associated with the control element,
  the control element in the compact state comprises a first selection area comprising a graphic and text that are available for selection to initiate a presentation of a plurality of options associated with the control element,
  the plurality of options associated with the control element is hidden when the control element is presented in the compact state,
  the first selection area of the control element in the compact state is displayed in a first format responsive to the plurality of options being in an unselected state,
  the control element in the compact state is associated with a counter indicating a number of users that have endorsed an entity associated with the control element,
  the counter associated with the control element is incremented to reflect a selection of an option of the plurality of options and decremented to reflect an unselection of the option, and
  the counter is distinct from the graphic and the text;
responsive to a selection of the first selection area of the control element, present the control element in an expanded state for display at the first view of the GUI, wherein
  the control element in the expanded state is presented with the plurality of options available for selection,
  the plurality of options comprising a default option and one or more non-default options,
  the control element in the expanded state comprises the graphic, the text, and a second selection area for each of the plurality of options,
  the control element in the expanded state is configured to present a first visual indicator responsive to a first selection of a first option of the plurality of options,
  the control element in the expanded state is configured to present a second visual indicator different than the first visual indicator responsive to a second selection of the first option and a second option of the plurality of options; and
modify a presentation of the control element from the expanded state to the compact state, wherein
  the modified presentation of the control element is provided for display at the first view of the GUI,
  the first selection area of the control element in the compact state is displayed in a second format indicative of a social action option, selected from the plurality of options, to endorse a post within a social network, and
  the first selection area of the control element in the compact state is displayed in the second format in the GUI adjacent to the post generated within the social network.

15. The method of claim 1, wherein in the expanded state a cursor is initially positioned for selection of the default option of the plurality of options.

16. The non-transitory computer-readable storage medium of claim 9, wherein in the expanded state a cursor is initially positioned for selection of the default option of the plurality of options.

17. The system of claim 14, wherein in the expanded state a cursor is initially positioned for selection of the default option of the plurality of options.

\* \* \* \* \*